Nov. 10, 1931.   J. F. PETERS   1,831,636
PROTECTIVE RELAY SYSTEM
Filed Sept. 23, 1927   2 Sheets-Sheet 1
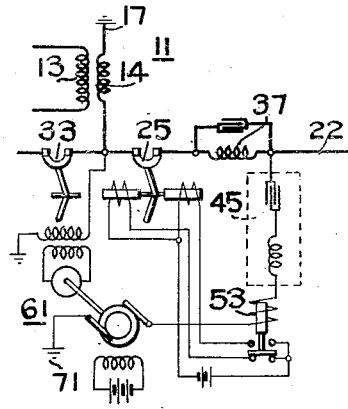
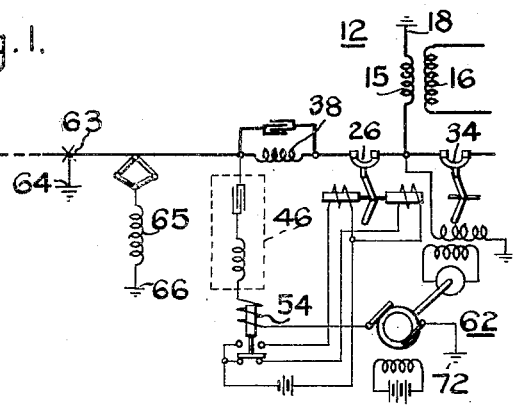
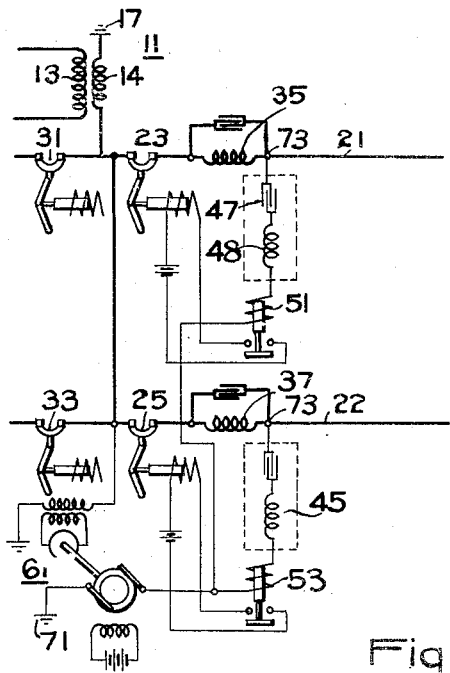
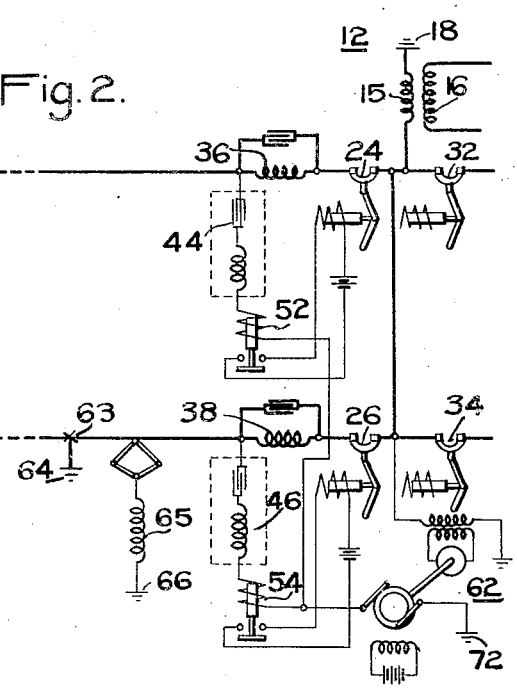
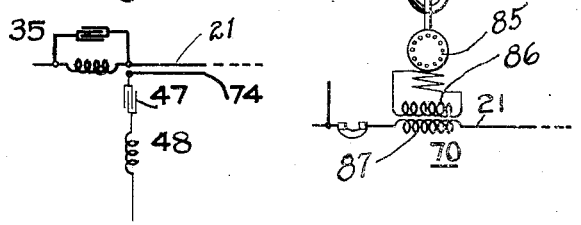
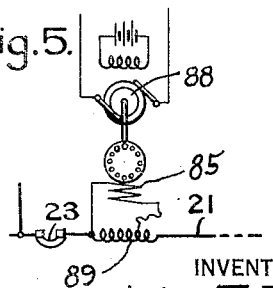
INVENTOR
John F Peters.
BY
ATTORNEY Nov. 10, 1931.  J. F. PETERS  1,831,636
PROTECTIVE RELAY SYSTEM
Filed Sept. 23, 1927  2 Sheets-Sheet 2
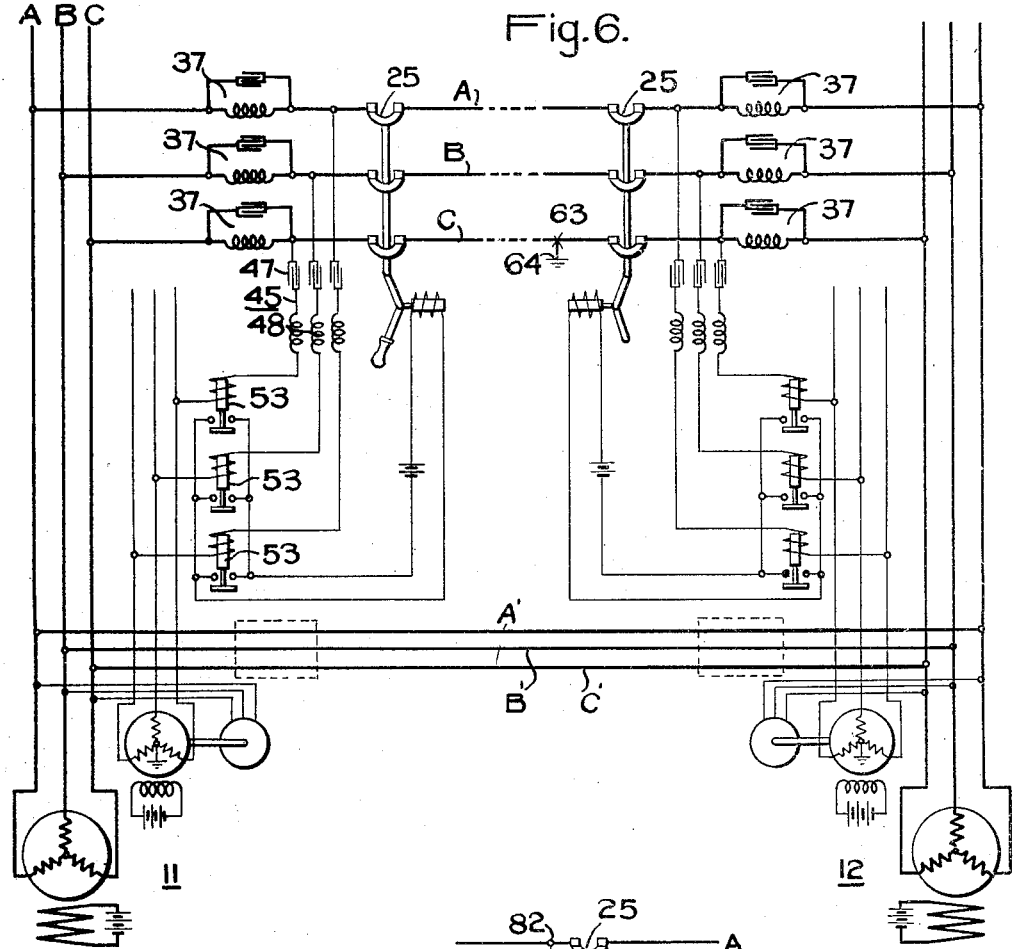
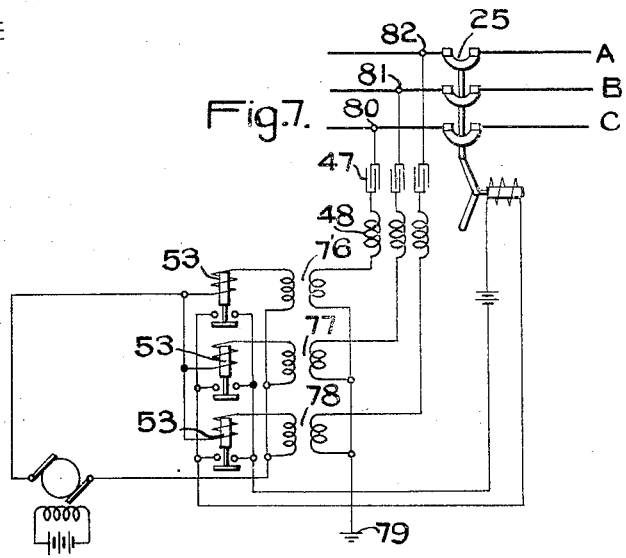
INVENTOR
John F. Peters.
BY
ATTORNEY Patented Nov. 10, 1931

1,831,636

UNITED STATES PATENT OFFICE

JOHN F. PETERS, OF EDGEWOOD, PENNSYLVANIA, ASSIGNOR TO WESTINGHOUSE ELECTRIC & MANUFACTURING COMPANY, A CORPORATION OF PENNSYLVANIA

PROTECTIVE RELAY SYSTEM

Application filed September 23, 1927. Serial No. 221,605.

This invention relates to protective relay systems for power transmitting and distributing systems and particularly to systems utilizing high-frequency currents superimposed upon the power systems.

One object of this invention is to provide simultaneous operation of circuit breakers at the two ends of a protected line or conductor.

Another object is to provide selectivity, such that a fault on one line or conductor will not cause breakers on parallel lines or on any other lines to respond, but will isolate the faulty line only.

Another object is to provide protection of the line against short circuits or faults only, by the avoidance of breaker action on heavy loads when the current rush may be greater than at a short circuit condition.

Another object is to provide a protection that will be independent of operation conditions, such as:— a. Number of generators operating.
b. Amount of equipment in a branch or section.
c. Trolley "bumping" or severe starting. (By "trolley 'bumping'" is meant the trolley or pantagraph of railway-motored equipment leaving the contact line and returning thereto.)
d. Load on any section.

Another object is to provide protection against faults occurring in a locomotive or in car equipments or in other load apparatus generally.

Another object is to provide protection which will be independent of the type of locomotive or car, signalling circuits, etc.

Another object is to provide a system offering minimum difficulties in telephone interference due to its operation.

Another object is to provide a measure of the duration of a fault and also automatic reclosing of circuit interrupters.

Another object is to provide a relay system capable of effective operation with high-speed circuit breakers.

Another object is to provide a relay system for completely isolating a faulty feeder, faulty feeder conductor, or section, or line, in an electrical system within a relatively short time interval from the instant the fault occurs.

Another object is to provide a relay system having perfect selectivity for protecting the system from a fault occurring at or near a substation.

Another object is to provide a system of protection dependent upon circuit conditions such as circuit impedance or the circuit constants rather than dependent upon load conditions.

Another object is to provide a system capable of avoiding accumulative time settings of breakers.

This protective system makes possible an almost absolute protection of any power supply system in that it provides perfect selectivity for isolating the faulty section only, by differentiating between heavy loads and fault currents, and by providing simultaneous operation of high-speed breakers at each end of the faulty conductor. These features are not attainable with present methods of protection now in use. The invention is applicable to power systems generally whether alternating-current or direct-current but will be described and illustrated herein with particular reference to a single-phase railway electrification, wherein the problem of obtaining selective high-speed relaying of parallel trolley feeders or conductors presents unusual difficulties, but which are all solved by this system. In such a system, at each of the step-down stations there are usually parallel trolley wires or conductors of equal impedance, thus making the problem of selective relaying or isolation of the faulty feeder conductor a very difficult one.

In addition to the problem of selective high-speed relaying, there is also that of proper discrimination between load-currents and short-circuit currents on a railway network, the short-time peak loads of which sometimes reach very high values, and for this reason the ordinary overload relays would have to be set at relatively high-current values, with some disadvantage to protection. Frequently, the maximum load current is not much less in magnitude than the short-circuit current or fault current which may flow from one end of the section conductor. If the short-circuit or fault occurs near the other end of the conductor, another important requirement of a relay system for high-speed breakers is that of insuring practically simultaneous operation of the isolating devices. If the isolating device near the fault operates first, a long stub-end feed would exist, thus causing severe voltages to be induced in paralleling communication circuits. This protective system herein disclosed satisfactorily satisfies all of these requirements.

In this invention 500 cycles or other suitable high-frequency current of frequency different from the main source of power, is superimposed upon each of the various lines or conductors to be protected and is utilized for controlling circuit interrupters placed at the ends of each line or conductor. The principle involved is to isolate branches of the network to the superimposed frequency and make the action of a breaker-tripping relay dependent upon the impedance of these branches. The system, therefore, provides protection dependent upon circuit conditions rather than protection dependent upon load conditions.

By utilizing the superimposed high frequency currents to control the isolation of the faulty conductor, high speed operation may be obtained since the isolation will be effected within a few cycles of the high frequency current, which would involve a time interval well within that of one cycle of the main power current. The usual trouble of inductive interference in nearby telephone lines is thus reduced to a minimum.

As applied to railway electrification, a power system is divided into sections by substations. In each substation a single generator supplies current to the outgoing lines through suitable transformers. According to the present invention, a resonant shunt is disposed at the end of each line or conductor consisting of a reactor shunted with a condenser, the constants of which are such that they are resonant at 500 cycles, or to the frequency of the auxiliary superimposed currents. In this way, their impedance to the 500-cycle current to which they are tuned is made high, whereas they will readily pass the lower frequency load current of 25 cycles in the application under discussion. The network is thus divided into sections, and 500-cycle current impressed on any conductor or line must remain on that conductor only within the section.

Under conditions of no-load on the conductor, the 500-cycle sources of power which are synchronized will have equal and opposite voltages so that no auxiliary current will flow. In case a load such as a locomotive is connected between the conductor and its return path, a certain amount of auxiliary current at 500 cycles can flow, but because of the relatively high impedance of the locomotive and load equipment to the passage of 500 cycles, the auxiliary current will be insufficient to operate the relays controlling the isolating devices.

A short circuit, however, because its impedance is relatively small, allows a greater 500-cycle auxiliary current to flow and so both of the circuit interrupters at the ends of the conductor will operate and isolate the faulty conductor. The 500-cycle current impressed on the other conductors in the system cannot flow to the short-circuit involved in the particular conductor now under consideration on account of the high impedance of the tuned resonant shunts or impedance devices by which they are obstructed.

It is important in using 500-cycle current on lines which parallel telephone lines to avoid such current magnitudes as will interfere with telephone speech. Although the use of polyphase auxiliary generators or of other polyphase sources of auxiliary power causes the cancellation of resultant ampere-miles in parallel contact lines, and, also, under load conditions, the current in a single transmission line flows in opposite directions, and therefore the resultant ampere-miles in that line theoretically cancel, it is nevertheless desirable to keep the ampere-miles in each line at a minimum. But at the same time, sufficient current must flow in the lines to operate the relays. The relay currents used in this system are well below the limits set by telephone interference, and it is therefore possible to avoid telephone troubles by using currents of relatively small values.

Figure 1 of the accompanying drawings shows the protective system applied to a single conductor between substations.

Fig. 2 illustrates the same system applied to two conductors in parallel-circuit relation in one section of the system.

Fig. 3 illustrates another means of connecting the auxiliary source of power to the conductor.

Fig. 4 illustrates another type of blocking device utilizing an induction motor and a two-winding transformer.

Fig. 5 illustrates the use of an auto-transformer in place of a two-winding transformer in a blocking device.

Fig. 6 illustrates this protective system applied to a three-phase power system, and Fig. 7 illustrates this protective system applied to a three-power phase system as in Fig. 6, except utilizing a single phase auxiliary source of power.

Referring to Figs. 1 and 2, there is illustrated a portion of a power system which may be divided into sections by substations 11 and 12, from which the main supply of power at 25 cycles is fed to the conductors 21 and 22, through the step-down transformers 13—14 and 15—16, respectively. One terminal of the transformer secondary 14 is connected to the ground connection 17 and the other terminal to the multiple conductors 21 and 22 and also to similar conductors in the adjacent section of the power system, through circuit-interrupting devices. Likewise, the secondary 15 of the step-down power transformer 15—16 is connected to the ground return 18 and to the other ends of the conductors 21 and 22, and also to conductors in the adjacent section. The conductor 21 is provided with isolating devices 23 and 24, one at each end, respectively, and similarly, conductor 22 is provided with isolating devices 25 and 26 at the respective ends thereof.

An auxiliary source of power 61 of a frequency different from that of the main source of power 11 is connected near one end 73 of each of the conductors, and at the other end of the same conductors 21 and 22, another auxiliary source of power 62 of the same frequency is connected. The voltages of the auxiliary sources of power 61 and 62 are equal and opposite in phase relation, so that when connected to each conductor, an auxiliary circuit is closed through ground returns 71 and 72, but in which circuits substantially no current flows under normal conditions of operation since the auxiliary circuits are substantially balanced.

The sources 61 and 62 are preferably generators driven by motors energized from the main circuits. Synchronous relationship between the generator voltages is thus maintained.

Impedance devices or blocking shunts 35, 36, 37 and 38 comprising a condenser and reactor in parallel circuit relation, and tuned to the auxiliary frequency are connected in the conductors at the ends thereof, so as to segregate the superimposed auxiliary currents in each conductor from any of the other conductors.

In order to obstruct or block currents from the main power source 11 or 12 from flowing into the auxiliary circuits, there is provided a condenser 47 so designed as to pass the auxiliary currents of relatively high-frequency and to obstruct main-source currents of lower frequency. In series-circuit-relation with condenser 47, there is a reactor 48, the combination of which may be designated as a wave filter consisting of a simple series-resonant circuit, being tuned to the frequency of the auxiliary source, 500-cycles in this case, so as to pass such fundamental frequency freely and at the same time substantially obstruct harmonics thereof. Similar to this filter device which has a natural frequency of 500 cycles, there are provided near the ends of the other conductors like devices, 44, 45 and 46 as illustrated, each circuit in which they are placed having a natural frequency of 500 cycles.

Connected in the auxiliary circuit there is a relay 51 responsive to the auxiliary currents for actuating the interrupting device 23. Similarly, relays 52, 53 and 54 are provided in each of the other auxiliary circuits, connected with the other end of the same conductor and also with the ends of all other conductors.

Likewise, relays similar to 51, are provided in adjacent sections for actuating the circuit interrupters 31, 32, 33 and 34.

Under conditions of normal operation, and for the moment assuming no load between the conductor 22 and its return path, the conductor 22 is energized with current from the main sources of power of 25 cycles at substations 11 and 12 through the isolating devices 25 and 26 which are closed, and through the impedance devices 37 and 38. The auxiliary sources 61 and 62 at each end of the conductor 22 being of equal voltage and opposite in phase relation, provide substantially no circulating current through either of the relays 53 or 54 and, consequently, the circuit breakers 25 and 26, respectively, are not affected. If a load 65 is connected to the system between conductor 22 and the return path 66, a closed circuit is formed through each of the following paths:—

*Path No. 1.*—Commencing at the auxiliary source 61, through the relay 53, through the filter device 45, conductor 22, the load 65, the return path 66, the ground return 71.

*Path No. 2.*—Commencing with the auxiliary source 62, the relay 54, the filter device 46, the load 65, ground return 66, and closing the auxiliary circuit through the ground return 72.

The impedances of the auxiliary circuits are, therefore, reduced to some extent, so as to permit auxiliary currents to flow, but such currents are insufficient, however, to operate the relays 53 and 54, the reason being that the load connection 65 offers a relatively high impedance to the passage of the high frequency, 500-cycle auxiliary current.

However, when a fault connection occurs, as at 63, the connection provides a path of very little impedance to the passage of the auxiliary current and a 500-cycle current is set up in the auxiliary circuits of sufficient magnitude to operate relays 53 and 54 which actuate the circuit interrupters 25 and 26 simultaneously.

The protective system will, therefore, open both ends of the conductor 22 simultaneously. It is also independent of load currents and functions by measuring the impedance of circuit conditions and, therefore, is capable of discriminating between fault currents and load currents though the latter may be of greater magnitude than the former. It also operates selectively to isolate the faulty conductor 22 only, and not to disturb any other conductors in the system because the auxiliary currents are isolated within the conductor 22 by means of the impedance devices 37 and 38, which prevent relay-operating currents from passing into other relays in other sections or in other conductors. It is possible that in some cases auxiliary currents may pass through and beyond impedance devices 37 and 38, but in order to prevent them from entering other conductors, means may be placed intermediate for draining these oscillations. Such means may be a condenser connected at or near a junction point between sections and the return path. Ordinarily, however, the impedance to 500 cycles of the impedance devices 37 and 38 will be sufficiently high to prevent a current flow which will interfere with the relay operations.

Since the fault which may occur may be of a transient nature, it is desirable to reclose the interrupter when the faulty condition passes. The interrupters at both ends of the lines are therefore controlled by the control relay 53 to open under faulty conditions and to reclose when conditions become normal. For the sake of simplicity I have illustrated the tripping and closing circuits in simple manner without the usual cut-off circuits.

In Figs. 1 and 2, the auxiliary sources of control currents of special frequency 61 and 62 are shown as directly coupled to the conductors or lines 21 and 22. For example, in Fig. 2, such a direct coupling is illustrated by the reference numeral 73. Instead of being directly coupled, however, the auxiliary sources 61 and 62 may be inductively coupled, as is illustrated in Fig. 3, wherein there is shown a conductor 74 which is spaced parallel to the main conductor 21, somewhat in the manner of the usual carrier-current system of inductive coupling.

Another type of impedance device 70 which may be used instead of the reactor shunted with a condenser of the same reactance as illustrated by devices 35, 36, 37 and 38, is illustrated in Fig. 4 and consists of an induction motor 85 connected directly across the secondary winding 86 of a transformer whose primary winding 87 is placed in circuit with the contact conductor 21. This induction motor 85 may be driven by means of a synchronous motor 88 at synchronous speed corresponding to the frequency which is to be blocked out or obstructed, i. e. the auxiliary source frequency or 500 cycles in this instance.

The principle involved is that the motor 85 when running at synchronous speed, has an impedance which is equivalent to that of an open-circuited secondary and this means that the transformer 86—87 is open-circuited to the frequency which is to be blocked out. The transformer 86—87, therefore, has a very high impedance to 500 cycles. The limitation to the magnitude of this impedance is the magnetizing current of the induction motor 85. In other words, in the rotor of the induction motor 85, running at synchronous speed, there is not any voltage induced. The primary of this motor 85, therefore, has a high impedance, or the same impedance as though the motor were not running and the secondary were open-circuited. If we have an open-circuited secondary in the motor, the case is just the same as having an open-circuited transformer. This latter explains the high impedance of the motor 85 at synchronous speed corresponding to 500 cycles.

This is not a tuned circuit. A transformer 86—87 must be used in order to supply magnetizing current to the induction motor 85. The transformer may be either a two-winding transformer such as 86—87, or an autotransformer such as 89, illustrated in Fig. 5, and is to be connected as a current transformer in each of the main conductors such as 21.

Instead of an induction motor 85 for the purpose of providing a high impedance at the required frequency, a synchronous motor alone may be used, similar to the synchronous motor 88, provided the synchronous motor is equipped with a squirrel cage winding, such as a damping winding. In this case, the synchronous motor may furnish its own driving power and two machine units are not then required.

The load current in the contact line 21 is not affected by the blocking device 70 for the following reasons:—The induction motor 85 is not operating at synchronous speed corresponding to load current frequency of 25 cycles. Therefore, voltage will be induced in the secondary of the induction motor 85 and the condition therein corresponds to that of a short-circuited transformer which means that the transformer 86—87 placed in the contact line is also short-circuited. The short-circuited transformer has a very low impedance or merely that corresponding to the leakage flux, and permits load currents of 25 cycles to pass freely.

This protective system is equally applicable to a three-phase power system as illustrated in Fig. 6, wherein there is shown one portion of a power system divided into sections by sub-stations between which there may be several parallel transmission lines of three phases, one line being represented by phases A, B and C and the other line parallel thereto by phases A', B' and C'. A blocking shunt device such as 37 is located in each main conductor near each end of the conductors as previously described. Similarly, the three-phase transmission line is equipped with interrupting devices near the ends thereof such as interrupting devices 25. The auxiliary source of power of 500 cycles is applied to each of the conductors near both ends exactly as described previously, except that the auxiliary source of power illustrated in Fig. 6 is three-phase. The principle of operation is identical with that previously described. Each main conductor is isolated to the superimposed 500 cycle auxiliary sources of power, those at the ends of the same conductor operating in phase opposition, and serving to measure the impedance of a circuit established by a fault connection between any main conductor and ground, and the 500 cycle auxiliary current set up by such a fault connection utilized to operate the isolating devices.

In Fig. 6, a three-phase auxiliary source of power is shown. However, as shown in Fig. 7, a single phase auxiliary source will give satisfactory operation provided transformers 76, 77 and 78 of different voltage ratios are applied to each of the phases at connections 80, 81 and 82. The principle involved is to apply voltages which are either in phase voltages with different magnitudes such as shown in Fig. 7, or equal voltages out of phase, such as shown in the three-phase auxiliary source of Fig. 6. The object is to merely apply instantaneously different potentials so that a 500 cycle current can flow when a fault connection occurs between any of the main conductors.

In summary, the principal advantages of this protective system are that it provides a protection dependent upon circuit conditions rather than dependent upon load conditions, that it isolates the faulty conductor only and leaves a balance of non-faulty conductors undisturbed, that it simultaneously interrupts both ends of a faulty conductor, that it discriminates between a fault condition and an overload condition, and that it provides an extremely high speed control for isolating a faulty conductor since the isolation is effected in a few cycles of the auxiliary superimposed frequency corresponding to less than a half cycle of the load frequency.

I claim as my invention:

1. The combination with a main conductor and a return path, interrupting devices therefor, actuating means for the interrupting devices, and a main source of power of one fundamental frequency connected thereto, of auxiliary sources of power having a common, constant frequency different from the fundamental frequency of the main source of power, one of said auxiliary sources being near each end of the conductor, said two auxiliary sources having voltages which are instantaneously equal and opposite in phase relation, means for confining currents of auxiliary-source frequency within the limits of the conductor, means for connecting the auxiliary sources between the conductor and the return path near each end of the conductor comprising a condenser and a reactor in series circuit relation tuned to the auxiliary-source frequency, each end of the main conductor being equipped with relay apparatus responsive to currents of the auxiliary-source frequency for actuating the interrupting devices at the respective ends of the conductor substantially instantaneously.

2. The combination with a plurality of main conductors in parallel circuit relation in each section of a power system, a return path for the main conductors, isolating devices for each main conductor, actuating means for the isolating devices, and a main source of power connected thereto, of auxiliary sources of power having a common, constant frequency different from the fundamental frequency of the main source of power, one of said auxiliary sources being near each end of each main conductor, those connected to the same conductor being instantaneously equal and opposite in phase relation, means for confining currents of auxiliary-source frequency within the limits of each main conductor comprising a parallel resonant device tuned to the auxiliary source, means for connecting one of the auxiliary sources between each of the main conductors near each end of each conductor comprising a condenser and a reactor in series circuit relation tuned to the auxiliary-source frequency, each end of each main conductor being equipped with relay apparatus responsive to currents of the auxiliary-source frequency for actuating the interrupting devices at the respective ends of the conductor substantially instantaneously.

3. In a protective system, the combination with a main conductor, a return path therefor, isolating devices therefor, means for actuating the isolating devices and a main source of power connected to the main conductor and to the return path, of an auxiliary constant-voltage source associated with each end of the conductor, said auxiliary sources being equal and opposite in phase relation, and having a common, constant frequency different from that of the main source, an auxiliary circuit near each end of the main conductor for connecting the auxiliary sources between the main conductor and the return path, means for confining currents of auxiliary-source frequency within the limits of the main conductor, means for blocking the main-source currents from the auxiliary circuits and for selectively admitting the currents of the auxiliary-source frequency in the auxiliary circuits, thereby minimizing the impedances of the auxiliary circuits to the passage of auxiliary-source currents, whereby the establishment of a connection between the main conductor and the return path changes the impedances of the auxiliary circuits, and means responsive to changes of auxiliary-circuit impedances for actuating the isolating devices at both ends of a faulty section substantially instantaneously.

4. A protective system for a plurality of separable sections arranged to be supplied with current from different substations, and having a plurality of parallel conductors in the sections, including parallel tuned condensers and reactors and means responsive to auxiliary current of a predetermined special control frequency for selectively isolating only one of the conductors simultaneously at both ends from the remainder of the system, and auxiliary alternating-current sources at the substations of the sections for supplying to both ends of each conductor currents of the predetermined control frequency to actuate said control frequency current responsive means.

5. A protective system for a plurality of line sections, having a plurality of parallel conductors in each section, and isolating devices for segregating the conductors, comprising means for superimposing constant-potential currents of a special control frequency near the ends of each conductor, means including a condenser and a reactor tuned to the special frequency for segregating the control-frequency currents of one conductor from all other conductors, and means responsive to the control-frequency currents in any conductor for operating the isolating devices of only that conductor substantially instantaneously at both ends.

6. A protective system for a plurality of line sections having a plurality of conductors in each section, including isolating devices for segregating the conductors, means for superimposing, through a condenser and a reactor connected in series circuit relation, currents of a special control frequency near the ends of each conductor, means including condensers and reactors for segregating the control-frequency currents of one conductor from all other conductors, and means responsive to the control-frequency currents in any conductor for operating the isolating devices of only that conductor substantially instantaneously at both ends.

7. A protective system for a plurality of sections of a power system divided into sections by substations supplying a main source of power to the ends of a plurality of conductors in each section including isolating devices, synchronized auxiliary sources of constant-potential power of a special control frequency associated with each substation, means for applying the auxiliary sources near both ends of each conductor so as to form a closed auxiliary-source circuit including control-frequency voltages which are normally balanced and opposed, means for segregating the auxiliary-source control-frequency currents of each conductor from all other conductors, whereby a fault connection alters the impedance of the auxiliary-source circuits and changes the flow of auxiliary-source currents, and means responsive to the auxiliary circuit currents of said special control frequency for operating the isolating devices substantially instantaneously at both ends.

8. The combination with a line to be selectively controlled in a transmission system, of circuit interrupters for isolating both ends of the line only upon the occurrence of a fault therein and for reconnecting said line in the absence of a fault, and control means for the interrupters including a plurality of continuously synchronized auxiliary sources of normally-balanced voltage of a single special control frequency superposed on both ends of the line through series-connected condensers and reactors tuned to the special frequency, relays responsive to the superposed currents of said special control frequency for controlling the opening and closing of said circuit-interrupters in response to conditions in said line, and means for confining the effects of said auxiliary sources to the line.

9. The combination with a circuit, of circuit interrupters therefor and interrupter-control means including a plurality of synchronized auxiliary sources of voltage having a special control-circuit frequency, and means for confining currents from said auxiliary sources to predetermined portions of the circuit, said means including alternating-current-motor means rotating at a synchronous speed corresponding to the frequency of the auxiliary sources of voltage.

10. In a protective system for the selective operation of circuit interrupters located at the respective ends of a plurality of parallel-connected conductors, the combination with control means for said interrupters including a plurality of synchronized auxiliary sources of normally balanced voltage of special control frequency superposed on both ends of the respective conductors, and means, including alternating-current-motor means inductively associated with the respective ends of said conductors, for confining the effects of said auxiliary sources to the respective conductors, said motor means being adapted to be run at a substantially synchronous speed corresponding to the auxiliary source frequency.

11. The combination with an electric power-line having a plurality of parallel power-circuits normally joined at each end, of means for supplying substantially constant-frequency high-frequency control-currents, terminal high-frequency impedance means in series with each of said parallel power-circuits at each end thereof, a plurality of parallel-connected high-frequency circuit-means for connecting said high-frequency supply-means continuously to the respective parallel power-circuits between the terminal high-frequency impedance means therein, said high-frequency connecting-circuit-means being substantially opaque to power currents, high-frequency-responsive relay-means at each end of each of the parallel power-circuits for selectively responding to abnormally low high-frequency impedance conditions in its particular power-circuit, and circuit-interrupter means operatively associated with said relay-means for selectively clearing a faulty power-circuit in response to said abnormally low high-frequency impedance conditions therein.

12. The combination with an electric power-line having a plurality of parallel power-circuits normally joined at each end, of means for supplying substantially constant-frequency high-frequency control-currents, terminal high-frequency impedance means in series with each of said parallel power-circuits at each end thereof, means for continuously superimposing said high-frequency control currents on all of said parallel power-circuits, high-frequency-responsive relay-means at each end of each of the parallel power-circuits for selectively responding to abnormally low high-frequency impedance conditions in its particular power-circuit between the terminal high-frequency impedance means therein, and circuit-interrupter means operatively associated with said relay-means for selectively clearing a faulty power-circuit in response to said abnormally low high-frequency impedance conditions therein.

13. The combination with an electric power-line-section, of means for supplying substantially constant-frequency high-frequency control-currents disposed at each end of the power line-section, both of said high-frequency supply-means having the same high frequency, terminal high-frequency impedance means in series with said power-line-section at each end thereof, means for continuously superimposing said high-frequency control currents on said power-line-section, high-frequency-responsive relay-means at each end of said power-line-section for selectively responding to abnormally low high-frequency impedance conditions between the terminal high-frequency impedance means therein, and circuit-interrupter means operatively associated with said relay-means for selectively clearing said power-line-section in response to said abnormally low high-frequency impedance conditions therein.

14. An electric power-transmitting system comprising a line-section having current-interrupting means at each end thereof, electro-responsive devices for causing the current-interrupting means at both ends to operate in response to a low-impedance condition indicative of a fault in said section, an auxiliary source of high-frequency relaying energy, means for imposing high-frequency currents from said auxiliary source on said line-section, and high-frequency electro-responsive devices for causing said current-interrupting means to be reclosed in response to a high-impedance, high-frequency condition indicative of the removal of the fault from said line-section.

15. The combination with an electric power-line having a plurality of parallel power-circuits normally joined at each end, of means for supplying substantially constant-frequency high-frequency control-currents, terminal high-frequency impedance means in series with each of said parallel power-circuits at each end thereof, a plurality of parallel-connected high-frequency circuit-means for connecting said high-frequency supply-means continuously to the respective parallel power-circuits between the terminal high-frequency impedance means therein, said high-frequency connecting-circuit-means being substantially opaque to power currents, high-frequency-responsive relay-means at each end of each of the parallel power-circuits for selectively responding to abnormally low high-frequency impedance conditions in its particular power-circuit, circuit-interrupter means operatively associated with said relay-means for selectively clearing a faulty power-circuit in response to said abnormally low high-frequency impedance conditions therein, and means for reconnecting said cleared section into normal service in response to a change of the high-frequency impedance conditions to a sufficiently high value to indicate the discontinuance of the fault condition.

In testimony whereof, I have hereunto subscribed my name this 12th day of September, 1927.

JOHN F. PETERS.